March 7, 1967          T. R. SMITH          3,307,571
VACUUM BREAKER
Filed April 13, 1964
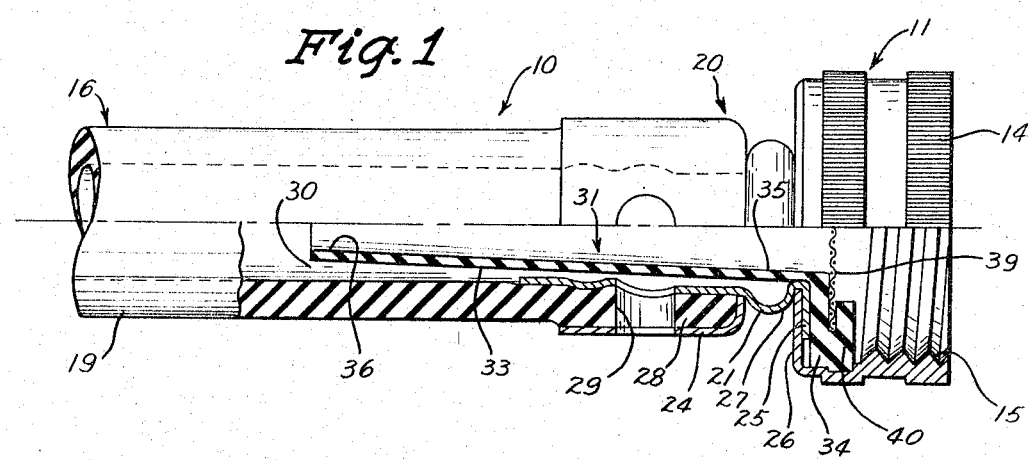
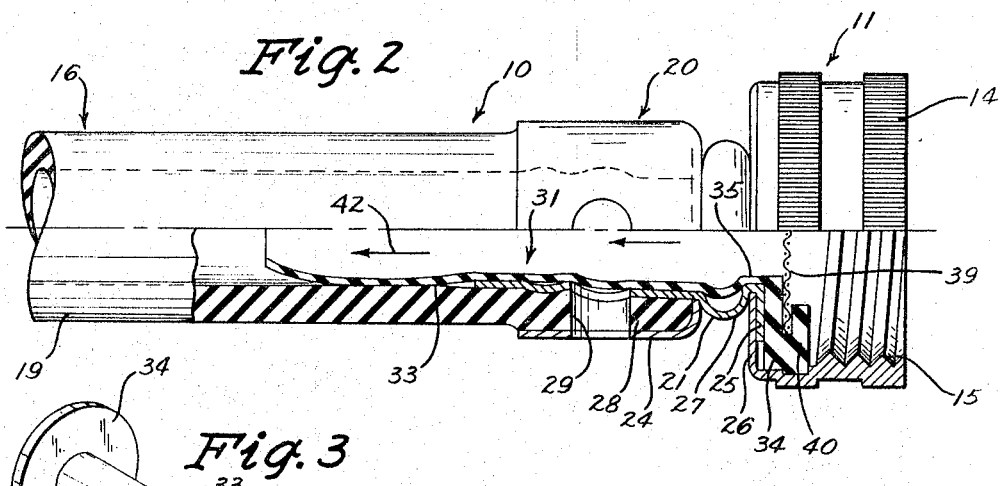
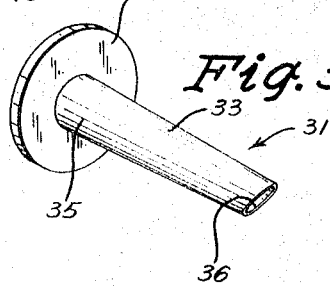
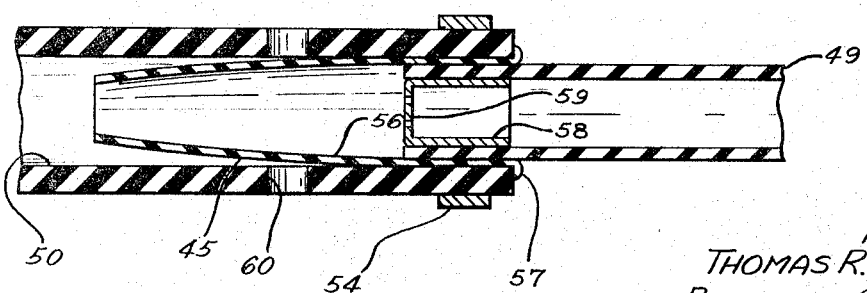
INVENTOR
THOMAS R. SMITH
By William G. Landwier
AGENT 3,307,571
VACUUM BREAKER
Thomas R. Smith, Newton, Iowa, assignor to The Maytag Company, Newton, Iowa, a corporation of Delaware
Filed Apr. 13, 1964, Ser. No. 359,036
2 Claims. (Cl. 137—218)

This invention relates to flow control devices and particularly to those commonly referred to as anti-siphon or vacuum break devices seful in preventing the back flow of liquids into a fluid supply system.

There is a definite need for a simple, inexpensive, and yet reliable device for preventing back flow of contaminated liquids into a water supply system, for example. The need for such a device has been recognized in a number of plumbing codes which include specific requirements for preventing the contamination of the water supply system in the event of a failure which would produce suction instead of pressure at the water supply system outlets.

The requirement for vacuum breaker or other back flow preventing devices is particularly important in automatically controlled appliances provided for the unattended washing of fabrics or dishes. In these devices it is not uncommon that water supply hoses are connected between the washing unit and an outlet of the water supply system. It is therefore essential that back flow preventing means be included in, or associated with, the water fill hoses. It is desirable that the device be simple, inexpensive, easily installed in the fluid conduit, but yet fully reliable for performing the intended function of allowing fluid flow in one direction under the pressure of the water supply system and be as fully effective for preventing the return flow under the opposite conditions of pressure differential.

It is therefore an object of this invention to provide an improved device for preventing back flow in a fluid conduit.

It is a further object of this invention to provide an improved back flow preventing device including venting means which is simple, inexpensive, and reliable.

It is a further object of this invention to provide an improved back flow preventing device which is easily inserted into a fluid conduit.

It is a further object of this invention to provide an improved back flow preventing device which will meet the plumbing code requirements in certain areas.

It is a still further object of this invention to provide a back flow preventing device including venting means which provides a large sealing area for closing the required venting holes.

It is yet a further object of this invention to provide a resilient flexible valve member for a back flow preventing device wherein the valve member is collapsible for sealing against reverse flow *but* which is prevented from becoming reversed under suction at the inlet.

The instant invention achieves the above objectives by providing a device for preventing back flow of fluids into a water supply system comprising a fluid conduit having at least one vent hole between the inlet and outlet and positioned adjacent to and closable by a flexible, resilient valve member. The valve member is positioned in said fluid conduit and includes an elongated tubular portion responsive to fluid pressure at the conduit inlet for expanding to close said vent holes. The valve member also includes a perforate member at the ingress end thereof. Upon a reversal of pressures acting on the fluid within the fluid conduit, the valve member collapses and seals upon itself for opening the vent holes and preventing flow of contaminated fluids into the water supply system. The perforate member prevents the valve member from turning inside out.

Operation of the invention and further objects thereof will become evident as the description proceeds and from an examination of the accompanying drawings which illustrate a preferred embodiment of the invention and in which similar numerals refer to similar parts throughout the several views.

In the drawings:

FIGURE 1 is a longitudinal view of a fluid conduit shown partially in section and including the back flow preventing means of the instant invention;

FIGURE 2 is a longitudinal section of a fluid conduit showing the back flow preventing means of the instant invention as in FIGURE 1 and although the connection to the water supply system is not shown, showing the fluid conduit and valve member as if carrying fluid under pressure at the inlet;

FIGURE 3 is a perspective view of the valve member of the back flow preventing device of the instant invention; and FIGURE 4 is an alternate embodiment of the instant invention showing the insertion of the back flow preventing device in a different form of fluid conduit.

Referring now to FIGURE 1, the aparatus is shown as comprising a fluid conduit 10 having an inlet end 11 and a conector 14 with interal threads 15. Outlet end 16 is coaxial with inlet 11 and is in the form of a flexible hose 19. Connector 14 is attached to flexible hose 19 by a coupling assembly 20 which includes internal sleeve 21 and external sleeve 24. Internal sleeve 21 is formed with an annular flange 25 extending radially outward at one end thereof. Flange 26 of connector 14 is retained between flange 25 and shoulder 27 of internal sleeve 21 for rotatably attaching connector 14 to internal sleeve 21. A portion of internal sleeve 21 is deformed and expanded outwardly to securely clamp end 28 of flexible hose 19 between the substantially rigid internal and external sleeve members 21 and 24. External sleeve 24 may also be deformed in addition to, or instead of, the internal sleeve 21 for clamping end 28 of flexible hose 19.

The fluid conduit 10 is vented to the atmosphere through vent holes 29 and the annular vent passage 30 when fluid pressure is not maintaining vent holes 29 closed as will be more fully explained hereinafter. This invention includes the provision for a plurality of vent holes, specifically four in this embodiment for assuring sufficient venting to the atmosphere. The vent holes 29 extend through the rigid internal and external sleeves 21 and 24, respectively, and through end 28 of fiexible hose 19. The internal sleeve 21 should be free of burrs at the holes on the inside of the fluid conduit 10.

A flexible resilient valve member 31 is positioned within the fluid conduit 10. In the first embodiment, as shown in FIGURE 1, valve member 31 is inserted into the fluid conduit 10 through connector 14 so that the annular ingress portion 34 of valve member 31 in the form of a flange, is seated into connector 14 against flange 25 of the internal sleeve 21 and thereby preventing passage of fluids around the valve member. Upon insertion of valve member 31 into the fluid conduit, as shown in FIGURE 1 and the subsequent attachment of connector 14 to an externally threaded water supply outlet, annular ingress portion 34 becomes clamped in place for retaining valve member 31 in a fixed axial position relative to conduit 10.

Valve member 31 further includes an elongated tubular portion 33 and a substantially circular fluid entrance or ingress opening 35 at ingress portion 34. The elongated tubular portion 33 normally extends from circular ingress opening 35 in a substantially conical configuration toward egress opening 36. Egress opening 36, however, may assume a flattened configuration when no fluid is flowing through the valve member 31 and thus tubular portion 33 serves as a gradual transition between the conical portion at ingress opening 35 and the flattened end at egress 36. The relaxed tubular portion defines a fluid passage of decreasing size between ingress opening 35 and egress opening 36. The flattened portion can aid the closing and self-sealing of valve member 31 upon encountering a negative pressure at ingress opening 35 for preventing back flow of fluids into the water supply system.

It is noted that the diameter of elongated tubular portion 33 of valve member 31 is formed with a diameter slightly less than that of the internal sleeve 21 juxtaposed to vent holes 29 for permitting the venting of fluid conduit 10 to the atmosphere when fluid is not flowing but close enough to effectively seal the vent holes upon flow of fluid. It is also noted that the tubular portion has substantial length relative to its diameter so that the tendency to turn inside out during pressure reversals is effectively eliminated. Valve member 31 is openly disposed within the fluid conduit 10. There are no deflectors or other members within its internal diameter which might collect or trap foreign matter and thereby prevent the satisfactory closing of end 36 when reverse pressures are encountered.

Attached to annular ingress portion 34 of valve member 31 is a perforate member, such as screen 39. It is recognized, however, that a member having single perforations of the proper size may be sufficient. The perforate member will prevent tubular portion 33 of valve member 31 from turning inside out with negative pressure at inlet 11. Screen 39 may be molded into place, as in this embodiment, or may be provided as a separate member to be inserted next to ingress portion 34 subsequent to the positioning of valve member 31. The perforate member, such as screen 39, for example, may be substantially flat as shown in FIGURES 1 and 2 or have a conical shape pointing upstream so as to prevent clogging by collected particles. Also attached integrally with ingress portion 34 is an annular sealing member 40 which is engageable by a mating externally threaded connector (not shown) for preventing leakage of fluid from the water supply conduit between the threaded connectors.

The hose and coupling assembly of the instant invention is easily and economically fabricated as follows: the external and internal sleeves 24 and 21 are placed loosely on end 28 of hose 19 and the internal sleeve 21 is radially expanded to securely clamp the end of hose 19 between the rigid sleeve members. The desired number of holes are then drilled through the external sleeve, the hose, and the internal sleeve 21 to vent the conduit to the atmosphere. The drilled holes are wire brushed, for example, to remove all burrs on the internal and external diameters. The valve member is then easily inserted into the conduit for subsequent connection to the water supply system.

In describing the operation of the back flow preventing device of the instant invention it may initially be noted that valve member 31 is capable of assuming three positions corresponding to three distinct conditions of fluid flow or pressure differential. The first condition is substantially that as shown in FIGURE 1 wherein valve member 31 is in the relaxed condition and wherein no fluid is flowing through the conduit 10 and no pressure is present at the ingress opening of valve member 31. The second condition assumed by valve member 31 is substantially as shown in FIGURE 2 wherein fluid is flowing through conduit 10 in a first direction as indicated by arrow 42 from the inlet toward the outlet under a medium or normal positive fluid pressure at the inlet end 11 and valve member 31 is expanded to close vent passage 30 and vent holes 29 to permit flow of fluid through valve member 31 into and through fluid conduit 10.

The third condition of valve member 31 is that which occurs when a reverse pressure differential, such as with a negative pressure or a suction, is applied to the upstream side of valve member 31. First, tubular portion 33 of valve member 31 is caused to collapse at egress opening 36, to seal upon itself and to open vent holes 29. Increased suction causes further flattening along the elongated sleeve and a longitudinal collapse and movement of the sleeve portion toward the ingress opening with a tendency toward concurrent spiral movement. Screen 39 will prevent the collapsing from continuing to the point at which valve member 31 will reverse or turn inside out under the negative pressure. Passage or flow of fluids from conduit 10 into and through valve member 31 in the direction toward inlet end 11 is thereby prevented.

As previously indicated, FIGURE 2 shows the expanded position of valve member 31 when conduit 10 is subjected to a medium, or normal range of pressures. The elongated tubular portion 33 of valve member 31 is radially expanded and seated against the internal wall of flexible hose 19 and against the internal sleeve 21 of coupling assembly 20. The flexible resilient valve member 31 does not necessarily conform exactly to the internal configuration of sleeve 21 but is effective for closing vent holes 29 and preventing passage of fluid, either water out of hole 29 or air in through hole 29. Egress opening 36 of valve member 31 also expands toward the internal wall of conduit 10 for reducing the restriction within the fluid passage of conduit 10 to a minimum.

At lower fluid pressures, valve member 31 does not fully expand to seat against the wall of conduit 10 but instead tends to act as a nozzle with the fluid directed downstream through egress opening 36 of valve member 31. The vents 29 are not fully closed but there is no leakage therethrough because no back pressure is built up.

At pressures above the medium or normal pressure, there is a tendency for the valve member 31 to break away from the wall of conduit 10 and allow some aspiration through vent holes 29 into conduit 10. There is some turbulence of water downstream from egress opening 36 of valve member 31 but there is no leakage back and out through vent holes 29.

Referring now to FIGURE 4, there is shown an alternate embodiment of the present invention wherein a valve member 45 is inserted into a fluid-carrying system including inlet conduit 49 and outlet conduit 50. Valve member 45 may be formed to include a resilient tubular portion 56 which is adapted to be inserted into the end of outlet conduit 50 and to receive coaxially the end of inlet conduit 49. Attached to tubular portion 56 is an annular lip 57 which will abut the end of outlet conduit 50 when tubular portion 56 is inserted therein. A perforate member 59 is attached to a rigid sleeve portion 58 and inserted into the end of inlet conduit 49. The perforate member 59 will prevent reversal of the valve member as previously described and the sleeve portion 58 will provide a rigid base for clamp 54 which may be positioned on the outside of outlet conduit 50 and properly seated to attain a leakage-free connection at the junction of the resilient inlet and outlet conduits with the valve member. The inlet or ingress end of the valve member is therefore retained between the telescoped ends of inlet conduit 49 and outlet conduit 50. A plurality of vent holes 60 are provided in the outlet conduit 50 in an area which may be closed and sealed by valve member 45 when subjected to water pressure as hereinabove described.

In the above specification, and in the following claims, the use of the terminology annular ingress portion is intended to include a circular configuration as well as others including square or elliptical configurations, for example. Also, positive pressure is defined as that condition which causes flow from the fluid supply system and through the conduit in a direction from the inlet to the outlet, while negative pressure is defined as that condition which tends to cause flow from said outlet toward said inlet.

It is thus seen that the present invention provides an improved back flow preventing device having the advantages of reliability with a relatively simple construction. Further advantages are present in the elongated valve member which is effective for providing a relatively large surface for sealing and which is constructed so as to eliminate the tendency to turn inside out with pressure reversals. It is a device which is easily insertable into a fluid conduit and which is relatively inexpensive to fabricate.

In the drawings and specification, there has been set forth a preferred embodiment of the invention and although specific terms are employed, these are used in a generic and descriptive sense only and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a vacuum breaker device for a fluid supply system, the combination comprising: a fluid conduit defined by at least one wall member and having an inlet end and an outlet end; connector means for attaching said conduit to said fluid supply system; an internal sleeve member positioned in said conduit and extending therefrom at said inlet end for rotatably receiving said connector means; an external sleeve member positioned on the outside of said wall member at said inlet end, said inlet end of said conduit being fixed between said internal and external sleeve members for attaching said connector to said conduit wall member; sealing means for preventing leakage from said fluid conduit when said connector is attached to said fluid supply system; vent means extending through said external sleeve, said wall member, and said internal sleeve to vent said conduit to the atmosphere; a valve member within said conduit including an annular ingress portion disposed within said connector means and a resilient tubular portion connected to said annular ingress portion and with said annular ingress portion defining an ingress opening at one end thereof, said tubular portion comprising an expandable and collapsible thin wall juxtaposed to said vent means and defining a relatively smaller egress opening at the other end of said tubular portion disposed between said vent means and said conduit outlet and uniformly tapered between said ingress and egress openings whereby positive fluid pressure in said ingress opening causes expansion of said tubular portion to close said vent means and normal negative pressure in said ingress opening causes collapsing of said tubular portion to open said vent means and seal said egress opening.

2. The vacuum breaker device as set forth in claim 1 and further comprising a perforate member disposed across said conduit juxtaposed to said ingress opening for preventing reversal of said tubular valve member.

References Cited by the Examiner

UNITED STATES PATENTS

| | | | |
|---|---|---|---|
| 488,160 | 12/1892 | Buhrman | 137—525.1 X |
| 2,328,382 | 8/1943 | Langdon | 137—525.1 X |
| 2,594,318 | 4/1952 | Langdon | 137—525.1 X |
| 2,598,002 | 5/1952 | Langdon | 137—218 |
| 2,675,823 | 4/1954 | Langdon | 137—218 |
| 2,686,066 | 8/1954 | Paquin | 285—256 X |
| 2,989,052 | 6/1961 | Broman | 137—525.1 X |
| 3,017,203 | 1/1962 | Macleod | 285—256 |

FOREIGN PATENTS 1,359,919  3/1963  France.

WILLIAM F. O'DEA, *Primary Examiner.*

D. LAMBERT, *Assistant Examiner.*